United States Patent
Kusano et al.

(10) Patent No.: US 7,726,826 B2
(45) Date of Patent: Jun. 1, 2010

(54) DIRECT-TYPE BACKLIGHT DEVICE

(75) Inventors: Kenji Kusano, Tochigi (JP); Masahiko Hayashi, Tokyo (JP); Keisuke Tsukada, Tokyo (JP); Yasunori Takahashi, Tokyo (JP)

(73) Assignee: Zeon Corporation, Tokyo (JP)

( * ) Notice: Subject to any disclaimer, the term of this patent is extended or adjusted under 35 U.S.C. 154(b) by 260 days.

(21) Appl. No.: 11/660,855

(22) PCT Filed: Aug. 23, 2005

(86) PCT No.: PCT/JP2005/015291

§ 371 (c)(1),
(2), (4) Date: Feb. 22, 2007

(87) PCT Pub. No.: WO2006/022270

PCT Pub. Date: Mar. 2, 2006

(65) Prior Publication Data

US 2008/0094845 A1    Apr. 24, 2008

(30) Foreign Application Priority Data

Aug. 24, 2004  (JP) .............................. 2004-243479
Nov. 25, 2004  (JP) .............................. 2004-340596
Dec. 10, 2004  (JP) .............................. 2004-358256
Jan. 14, 2005  (JP) .............................. 2005-008051

(51) Int. Cl.
G09F 13/04    (2006.01)
F21V 5/02    (2006.01)
F21V 7/04    (2006.01)
F21S 4/00    (2006.01)

(52) U.S. Cl. ............ 362/97.1; 362/217.05; 362/217.09; 362/224; 362/225; 362/308; 362/330; 362/331

(58) Field of Classification Search ............... 362/97, 362/225, 308, 97.1, 97.2, 97.4, 217.05, 217.07, 362/217.09, 224, 328, 330, 331, 339, 606, 362/607; 349/64
See application file for complete search history.

(56) References Cited

U.S. PATENT DOCUMENTS 6,100,952 A * 8/2000 Marvin et al. ................. 349/62

(Continued)

FOREIGN PATENT DOCUMENTS

DE    24 59 327 A1    6/1976

(Continued)

OTHER PUBLICATIONS

English translation of Yamada et al (JP 05-333333), Dec. 17, 1993.*
Japanese Office Action for application No. 2004-243479, dated Jan. 12, 2010.

Primary Examiner—Alan Cariaso
(74) Attorney, Agent, or Firm—Birch, Stewart, Kolasch & Birch, LLP

(57) ABSTRACT

A thin direct-type backlight capable of realizing high brightness uniformity is provided by a specific configuration of the direct-type backlight whereby high light beam utilization ratio is maintained while periodical unevenness of the light emitting surface is suppressed. In a direct-type backlight device having a plurality of linear light sources in parallel, a reflection plate and a light diffusion plate, at least one of main surfaces of the light diffusion plate is provided with a prismatic ridges having a sawtooth-shaped cross-section. The apex angle "y" (degree) of the prismatic ridge of the light diffusion plate, the distance "a" (mm) between centers of the adjacent linear light sources, and the distance "b" (mm) from a center of the linear light sources to a surface of the light diffusion plate facing the light source satisfy the relationship of $80 \times (b/a) + 15 < y < 180 \times (b/a) + 70$.

12 Claims, 5 Drawing Sheets

U.S. PATENT DOCUMENTS

| | | | |
|---|---|---|---|
| 6,560,023 B2 * | 5/2003 | Kashima et al. | 359/599 |
| 6,793,361 B2 * | 9/2004 | Matsui | 362/97.1 |
| 6,917,396 B2 * | 7/2005 | Hiraishi et al. | 349/64 |
| 7,063,448 B2 * | 6/2006 | Kang et al. | 362/558 |
| 7,178,967 B2 * | 2/2007 | Kim | 362/633 |
| 7,213,933 B2 * | 5/2007 | Chang et al. | 362/97.2 |
| 7,255,462 B2 * | 8/2007 | Tseng | 362/330 |
| 2003/0026085 A1 | 2/2003 | Ueda et al. | |

FOREIGN PATENT DOCUMENTS

| | | |
|---|---|---|
| EP | 0 293 182 A2 | 11/1988 |
| EP | 0 395 344 B1 | 10/1990 |
| JP | 3-163706 A | 7/1991 |
| JP | 5-333333 A | 12/1993 |
| JP | 6-222207 A | 8/1994 |
| JP | 6-273760 A | 9/1994 |
| JP | 8-297202 A | 11/1996 |
| JP | 10-10304 A | 1/1998 |
| JP | 2000-030515 A | 1/2000 |
| JP | 2000-182418 A | 6/2000 |
| JP | 2001-174813 A | 6/2001 |
| JP | 2001-202814 A | 7/2001 |
| JP | 2003-43481 A | 2/2003 |
| JP | 2004-12924 A | 1/2004 |
| JP | 2004-053998 A | 2/2004 |
| JP | 2004-192912 A | 7/2004 |
| JP | 2004-198725 A | 7/2004 |

* cited by examiner (a)

(b)

(c)

(d)

(e)

(f)

DIRECT-TYPE BACKLIGHT DEVICE

TECHNICAL FIELD

The present invention relates to a direct-type backlight device. More specifically, the present invention relates to a direct-type backlight device having high brightness and good brightness uniformity.

BACKGROUND ART

Conventionally, as a backlight device of a liquid crystal display, devices equipped with a cold cathode fluorescent lamp as a light source have been widely used. There are some types of such display devices which are called as an edge light type and a direct type. The edge light type device includes a thin tubes of the cold cathode fluorescent lamps arranged at a side edges of a light guide plate, and the light which has been input from the side edge repeatedly reflects in the light guide plate, and then emitted from a main surface of the light guide plate.

On the other hand, the direct type backlight device includes a combination of a plurality of the cold cathode fluorescent lamps arranged in parallel, a reflection plate provided behind the cold cathode fluorescent lamp, and a light diffusion plate serving as a light emitting surface. In contrast to the edge light type, the number of the cold cathode fluorescent lamps can be increased, and therefore, brightness on the light emitting surface can be easily increased.

However, the direct-type backlight device has a problem of poor brightness uniformity on the light emitting surface. Particularly, periodical unevenness in brightness caused by the high brightness at portions right above the cold cathode fluorescent lamps is a major problem. That is, if the brightness uniformity on the light emitting surface is poor, unevenness in display occurs on a display screen of a liquid crystal display.

In the direct-type backlight device, it is possible to improve the brightness uniformity by decreasing intervals between the cold cathode fluorescent lamps. However, such a solution results in an increased number of the cold cathode fluorescent lamps, leading to complicated manufacturing process and increased power consumption for lighting. Alternatively, it is possible to improve the brightness uniformity by increasing the distance between the cold cathode fluorescent lamps and the light diffusion plate. In that case, however, the backlight becomes thick, and a liquid crystal display cannot be made thin.

Conventionally, various measures to improve the brightness uniformity have been taken. For example, there have been proposed a method in which a light amount correction pattern consisting of a strip or a dot pattern is printed on the light diffusion plate to decrease light beam emitted right above the cold cathode fluorescent lamps (Patent Document 1, FIG. 6), and a method in which a wavy reflection plate is used to focus reflection light from the reflection plate in a region corresponding to midpoint between the cold cathode fluorescent lamps (Patent Document 2).

However, if the light amount correction pattern is printed as means for improving the brightness uniformity, a part of the light beam is blocked. Therefore, utilization ratio of the light beam emitted from the cold cathode fluorescent lamps decreases, leading to insufficient brightness. The application of the wavy reflection plate complicates the configuration of the device.

For producing the light diffusion plate used in the direct-type backlight device, a material containing a transparent resin and a light diffusing agent dispersed therein is often used. However, if concentration of the light diffusing agent is increased to improve the brightness uniformity, brightness is decreased. In order to solve this problem, there has been proposed a light diffusion plate having a pattern such as a prism form on the surface thereof for exerting diffusing effect by the surface pattern without decreasing the brightness (Patent Documents 3, 4, and 5). However, such a prismatic pattern on the surface of the light diffusion plate alone can not achieve sufficient improvement in the brightness uniformity.

List of the Prior Art Documents:
Patent Document 1: Japanese Patent Application Laid-open No. H6-273760, FIG. 6
Patent Document 2: Japanese Patent Application Laid-open No. 2001-174813 A
Patent Document 3: Japanese Patent Application Laid-open No. H5-333333 A
Patent Document 4: Japanese Patent Application Laid-open No. H8-297202 A
Patent Document 5: Japanese Patent Application Laid-open No. 2000-182418 A

DISCLOSURE OF INVENTION

Problem to be Solved by the Invention

The present invention relates to improvement of a direct-type backlight device, and it is an object of the invention to provide a thin direct-type backlight device in which high utilization ratio of light beams can be obtained, periodical unevenness in brightness caused on a light emitting surface can be suppressed, and improvement in both brightness and brightness uniformity can be achieved simultaneously.

Means for Solving Problem

As a result of elaborate researches in order to solve the above problems, the present inventors have surprisingly found that the following: Although the brightness uniformity is not sufficiently improved by merely providing prismatic ridges having a sawtooth cross-section on at least one main surface of the light diffusion plate, by providing a backlight having a specific novel relationship between the apex angle "y" of the prism, the interval "a" between adjacent linear light sources, and the interval "b" between the linear light source and a light diffusion plate, a backlight device having high brightness and good brightness uniformity can be obtained. The present invention has been achieved based on this knowledge.

That is, according to the present invention, the following are provided:

(1) A direct-type backlight device comprising: a plurality of linear light sources that are arranged in parallel, a reflection plate reflecting light from the linear light sources, a light diffusion plate for diffusing and emitting direct light from the linear light sources and reflected light from the reflected plate; and the reflection plate, the linear light sources, and the light diffusion plate being arranged in this order; wherein: the light diffusion plate has prismatic ridges (1) on at least one main surface thereof, each of the ridges having a sawtooth-shaped cross-section; and the apex angle "y" (degree) of the prismatic ridge (1) of the light diffusion plate, the distance "a" (mm) between centers of the adjacent linear light sources, and the distance "b" (mm) from a center of the linear light sources to the surface of the light diffusion plate facing the light source satisfy the following relationship:

$$80 \times (b/a) + 15 < y < 180 \times (b/a) + 70.$$

(2) The direct-type backlight device according to (1), wherein: the parameters "y", "a", and "b" satisfy the following relationship:

$$80\times(b/a)+30<y<180\times(b/a)+60.$$

(3) The direct-type backlight device according to (1), wherein: the direct-type backlight device further comprises a prism sheet on a surface of the light diffusion plate, the surface being on the opposite side to the light sources, for adjusting the output direction of the light that has been diffused by and emitted from the light diffusion plate; the light diffusion plate has the prismatic ridges (1) at least on the surface being on the opposite side to the light sources; the prismatic ridges (1) of the light diffusion plate has the apex angle "y" from 60° to 170° and the pitch from 20 μm to 700 μm; the prism sheet has a prismatic ridge (2) on the surface being on the opposite side to the light diffusion plate, the ridge (2) having a sawtooth-shaped cross-section; and the prismatic ridge (2) of the prism sheet has the apex angle from 70° to 120° and the pitch from 20 μm to 700 μm.

(4) The direct-type backlight device according to (3), wherein: each of the longitudinal direction of the prismatic ridges (1) of the light diffusion plate and that of the prismatic ridges (2) of the prism sheet is substantially parallel to the longitudinal direction of the linear light sources.

(5) The direct-type backlight device according to (1), wherein: the prismatic ridge (1) of the light diffusion plate has the apex angle "y" from 60° to 170° and the pitch from 20 μm to 700 μm; and the reflection plate has a protrusion that projects toward the light diffusion plate, the protrusion being located along the longitudinal direction of the light sources in the region corresponding to the position between the linear light sources.

(6) The direct-type backlight device according to (5), wherein: the median point of the base of the protrusion located on the reflection plate is positioned in the approximately middle part between the centers of the linear light sources; and the cross-section of the protrusion on the plane perpendicular to the longitudinal direction thereof is axisymmetric along the line passing through the median point of the base of the protrusion and perpendicular to the light diffusion plate.

(7) The direct-type backlight device according to (5), wherein: the device satisfy the relationship L>D; when D represents the shortest distance between the surface of the protrusion located on the reflection plate facing the light diffusion plate and the surface of the light diffusion plate facing the reflection plate; and L represents the distance between the center of the linear light sources and the surface of the light diffusion plate facing the reflection plate.

(8) The direct-type backlight device according to (5), wherein: the protrusion has a cross-section of any one of an isosceles triangle and an isosceles trapezoid.

(9) The direct-type backlight device according to (1), wherein: the prismatic ridge (1) of the light diffusion plate has the apex angle "y" from 60° to 170° and the pitch from 20 μm to 700 μm; and the direct-type backlight further comprises two to four sheets of diffusion sheets for adjusting light which has been diffused by and emitted from the light diffusion plate on the surface of the light diffusion plate, the surface being on the opposite side to the light sources.

(10) The direct-type backlight device according to any one of (1) to (9), wherein: the surface of the prismatic ridges (1) of the light diffusion plate has the center line average surface roughness (Ra) from 0.08 μm to 3 μm.

(11) The direct-type backlight device according to any one of (1) to (10), wherein: the angle between the longitudinal direction of the prismatic ridges (1) and the longitudinal direction of the linear light sources is equal to or less than 60 degrees.

(12) The direct-type backlight device according to any one of (1) to (11), wherein: the light diffusion plate is made of a composition containing a transparent resin and a light diffusing agent dispersed therein, the total light transmittance of the composition is from 60% to 92%, and the haze of the composition is from 40% to 94%.

(13) The direct-type backlight device according to (12), wherein: the transparent resin has the water absorption ratio from 0.25% or lower.

(14) The direct-type backlight device according to (12) or (13), wherein: the light diffusing agent is a polystyrene polymer or a polysiloxane polymer, or a cross-linked product thereof.

Effect of the Invention

The direct-type backlight device according to the present invention can utilize light beam at a high utilization ratio, and has a suppressed periodical unevenness in brightness on a light emitting surface. Therefore the device of the present invention can exhibit high brightness and good brightness uniformity.

EXPLANATION OF NUMERALS

Figure 1:
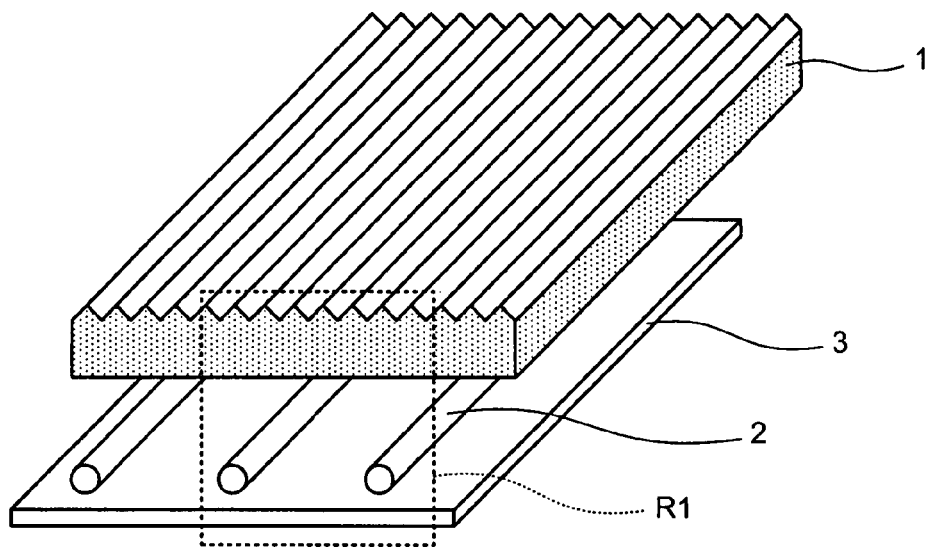
FIG. 1 is a perspective view showing one example of the direct-type backlight device according to the present invention.

1: Light diffusion plate
2: Linear light source
3: Reflection plate
4: Prism sheet
5: Apex of prismatic ridge of prism sheet
6: Protrusion on reflection plate
7: Approximate middle portion of centers of linear light sources
8-1, 8-2: Diffusion sheet
9: Optical member for improving brightness

BEST MODE FOR CARRYING OUT THE INVENTION

The backlight device according to the present invention is a direct-type backlight device comprising a plurality of linear light sources that are arranged in parallel; a reflection plate reflecting light from the linear light sources; and a light diffusion plate for diffusing and emitting direct light from the linear light sources and reflected light from the reflected plate, wherein the reflection plate, the linear light sources, and the light diffusion plate are arranged in this order. In the present backlight device, the light diffusion plate has prismatic ridges (1) on at least one main surface thereof, and each of the ridges has a sawtooth-shaped cross-section. In the present backlight device, the apex angle "y" (degree) of the prismatic ridge (1) of the light diffusion plate, the distance "a" (mm) between centers of the adjacent linear light sources, and the distance "b" (mm) from a center of the linear light sources to a surface of the light diffusion plate facing the light source satisfy the following relationship:

$$80 \times (b/a) + 15 < y < 180 \times (b/a) + 70 \quad \text{(Formula 1)}$$

The "center" of the linear light source refers to the center of a cross sectional shape of the linear light source along a plane perpendicular to the longitudinal direction of the linear light source. The "main surfaces" refer to a surface of the light diffusion plate having the largest area and another surface on the opposite side thereto, which may also be referred simply to as a "surface" in the present specification. In the explanation of a positional relationship of each component in the present specification, upward and downward directions refer to the same direction as upward and downward directions shown in FIGS. 1 to 9 unless otherwise specified. That is, the positional relationship of each component is explained assuming that the backlight device of the present invention is placed facing the light-emitting surface up.

Figure 2:
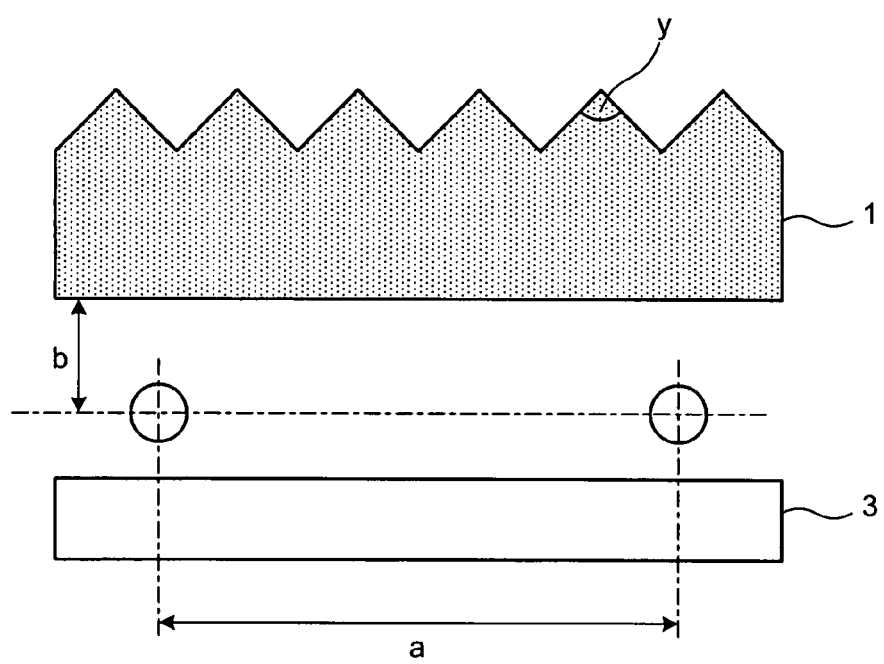
FIG. 2 is a partial enlarged cross-section showing further detail of the cross-section of the region R1 shown in FIG. 1.

FIG. 1 is a schematic perspective view of an embodiment of the direct-type backlight device of the present invention. FIG. 2 is a partial cross-sectional view schematically showing the cross section of the region R1 shown in FIG. 1. The direct-type backlight device of this embodiment includes a plurality of linear light sources 2 arranged in parallel at intervals of "a" mm between centers thereof, a reflection plate 3 that reflects light from the light source 2, and a light diffusion plate 1 that diffuses and emits direct light from the light source 2 and reflected light from the reflection plate. The light diffusion plate 1 is arranged such that a distance between the surface thereof facing the linear light source and the center of the linear light source is "b" mm, and includes prismatic ridges (1) having a sawtooth-shaped cross-section of which the apex angle is "y". The ridges (1) are provided on a main surface opposite to the light source. In order to improve brightness and brightness uniformity, a diffusion sheet and a prism sheet may be provided on the surface of the light diffusion plate opposite to the light source, as will be described later. Furthermore, in order to improve brightness, a reflecting light polarizer may be provided on a surface of the two kinds of sheets opposite to the light source 2. The prismatic ridges (1) may be provided on the main surface of the light diffusion plate 1 facing the light source, or on both main surfaces.

The reflecting light polarizer for use may include the following: a reflecting light polarizer utilizing a difference in reflection coefficient components based on Brewster's angle (for example, one described in Japanese Patent Application National Publication No. H6-508449 A (U.S. Pat. No. 5,559,634)); a reflecting light polarizer utilizing selective reflection property of Cholesteric liquid crystal, e.g., a lamination of a film made of the Cholesteric liquid crystal and a ¼ wavelength plate (for example, one described in Japanese Patent Application Laid-open No. H3-45906 A or in Japanese Patent Application Laid-open No. H6-324333 A (U.S. Pat. No. 5,721,603)); a reflecting light polarizer provided with a minute metallic linear pattern (for example, one described in Japanese Patent Application Laid-open No. H2-308106 A); a reflecting light polarizer in which at least two kinds of high polymer films are laminated and that utilizes anisotropy in reflection coefficient due to anisotropic refractive index (for example, one described in Japanese Patent Application National Publication No. H9-506837 A (International Publication WO95/17303)); a reflecting light polarizer made of a high polymer film having an "island-sea" structure configured with at least two types of high polymers, which utilizes anisotropy in reflection coefficient due to anisotropic refractive index (for example, one described in U.S. Pat. No. 5,825,543); a reflecting light polarizer in which particles are dispersed in a high polymer film, and that utilizes anisotropy in reflection coefficient due to anisotropic refractive index (for example, one described in Japanese Patent Application National Publication No. H11-509014 A (International Publication WO97/41484)); and a reflecting light polarizer in which inorganic particles are dispersed in a high polymer film, and that utilizes anisotropy in reflection coefficient based on difference in diffusing ability depending on particle sizes (for example, one described in Japanese Patent Application Laid-open No. H9-297204 A (U.S. Pat. No. 5,995,183)).

The linear light source used in the present invention is not specifically limited, and examples thereof may include the cold cathode fluorescent lamp, a hot cathode fluorescent lamp, LEDs arranged linearly, and a combination of the LED and the light guide. In addition to a linear shape, the cold cathode fluorescent lamp and the hot cathode fluorescent lamp may be in a U-shape such that two tubes arranged in parallel are connected with one substantially semicircle to constitute one tube, an N-shape formed such that three tubes arranged in parallel are connected with two substantially semicircles to constitute one tube, or a W-shape formed such that four tubes arranged in parallel are connected with three substantially semicircles to constitute one tube. When the light source of these three shapes is used, a distance between the centers of parallel portions of the tube is regarded as the distance "a" between the centers of the adjacent linear light sources.

It is preferable to use the cold cathode fluorescent lamp as the linear light source in terms of brightness uniformity. In terms of light emission efficiency, it is preferable to use the LEDs, or the combination of the LED and the light guide. If the LEDs arranged along a line or the combination of the LED and the light guide is used, it is regarded that the linear light sources are present in plurality when a plurality of sets of a series of LEDs arranged or a plurality of the combinations of the LED and the light guide are present.

Although the reflection plate is not specifically limited, white or silver colored resins, metal, and the like may be used therefor. The color thereof may preferably be white in terms of improving the brightness uniformity. The material thereof may preferably be resin in terms of weight reduction.

The distance "a" (mm) between the centers of the adjacent linear light sources may be designed considering properties of the light source and power to be used while lighted. Although value of the distance "a" is not specifically limited, it is preferable to be not less than 15 mm and not more than 150 mm, and more preferably, not less than 20 mm and not more than 100 mm. The distance "b" (mm) between the center of the linear light source and the surface of the diffusion plate facing the light source may be designed considering thickness of the backlight and the brightness uniformity. Although value of the distance "b" is not specifically limited, it is preferable to be not less than 5 mm and not more than 30 mm, and more preferably, not less than 5 mm and not more than 25 mm.

The distance "a" (mm) between the centers of the adjacent linear light sources, as well as the distance "b" between the center of the light source and the surface of the light diffusion plate facing the light source, are preferable to be uniform, although the device in which they are not uniform is acceptable. If the distances are not uniform, the aforementioned Formula 1 expressing the relationship between the apex angle "y" of the prism of the light diffusion plate, "a" and "b" is satisfied as to "y" taking the smallest value among "y"s right above within the region sandwiched by two light sources, "a" in the region, and a smaller one of two "b"s (mm) right above the two light sources sandwiching the region. In this case, if the apex angle "y" of the prism discontinuously varies right above the linear light source, the brightness uniformity may be degraded. Therefore, it is preferable that the angle continuously varies within a distance range corresponding to 20% of "a" from a point right above the linear light source along a perpendicular direction with respect to the center line of the linear light source.

In the present invention, the light diffusion plate is used in order to improve the brightness uniformity. The light diffusion plate has a light receiving surface and a light emitting surface. Light from the linear light source enters the light receiving surface facing the light source. The light is then diffused into various directions in the light diffusion plate or at the prismatic ridge having sawtooth-shaped cross-section that is provided on at least one of the light receiving surface and the light emitting surface. The light is then emitted from the light emitting surface positioned opposite to the light source. As a material of the light diffusion plate, glass, a compound of two or more types of resin that do not tend to be uniformly mixed, a composition of a transparent resin in which light diffusing agent is dispersed, etc. may be used, although the material is not specifically limited. In consideration of light weight and easiness in formation, a material including resin is preferable. In consideration of easy adjustment of total light transmittance and haze, a composition of a transparent resin in which light diffusing agent is dispersed is preferable. Furthermore, it is preferable to configure the prism ridge part in an integrated manner with a composition of the transparent resin in which light diffusing agent is dispersed, for giving uniform total light transmittance and haze to the light diffusion plate, because diversity of the direction of the emitted light from the light diffusion plate is thereby further improved.

In the composition of the transparent resin in which the light diffusing agent is dispersed, the containing ratio of the light diffusing agent is not specifically limited, and may be determined depending on thickness of the light diffusion plate, intervals of the linear light sources of the backlight, and the like. It is usually preferable to control the containing ratio of the light diffusing agent so that the total light transmittance is not less than 60% and not more than 92%, and it is more preferable to adjust the content of the light diffusing agent to be not less than 65% and not more than 92%. It is preferable to control the content of the light diffusing agent so that haze is not less than 40% and not more than 94%, and it is more preferable to adjust the content of the light diffusing agent so that the haze is not less than 50% and not more than 94%. If the total light transmittance is adjusted to be equal to or higher than 60% and haze to be equal to or lower than 94%, it is possible to further improve brightness. If the total light transmittance is adjusted to be equal to or lower than 92% and the haze to be equal to or higher than 40%, it is possible to further improve brightness uniformity. The total light transmittance is a value obtained by measuring a 2-mm thick plate having smooth surfaces on both sides in accordance with JIS K7361-1. The haze is a value obtained by measuring a 2-mm thick plate having smooth surfaces on both sides in accordance with JIS K7136.

The thickness of the light diffusion plate is not specifically limited either, although the thickness is preferably 0.4 mm to 5 mm, and more preferably 0.8 mm to 4 mm. If the thickness is less than 0.4 mm, structures such as many supports for avoiding deflection caused by weight of itself become necessary. Such structures complicate the configuration of the backlight, and are therefore not preferable. If the thickness exceeds 5 mm, molding thereof becomes difficult, therefore being not preferable.

In the present invention, upon emission from the light diffusion plate, the light is refracted into a specific direction by the light diffusion plate having a prism of a sawtooth-shaped cross-section having the apex angle "y" (degree), on at least one of the main surfaces. By adjusting the apex angle "y" (degree) of the prism of the light diffusion plate to be within a range satisfying the aforementioned Formula 1, where the distance between the centers of adjacent linear light sources is "a" (mm) and the distance between the center of the linear light source and the surface of the light diffusion plate on the side of the light source is "b" (mm), it is possible to adjust the direction of light emission from the light diffusion plate in a preferable manner, thereby simultaneously improving brightness and brightness uniformity.

Further, if "y", "a", and "b" are adjusted to satisfy the relationship of 80×(b/a)+30<y<180×(b/a)+60, it is possible to obtain a further preferable result. If the apex angle "y" (degree) of the prism is smaller than the lower limit in Formula 1, namely 80×(b/a)+15, average brightness may possibly be deteriorated. If the angle "y" is larger than the upper limit, namely 180×(b/a)+70, brightness uniformity may possibly be deteriorated.

In the present invention, the sawtooth-shaped cross-section of the prismatic ridge refers to a shape in which a triangular protrusion ranges in a cross-sectional plane along a direction perpendicular to a longitudinal direction of the ridge. The configuration may be such that a V-shaped groove is formed with triangular protrusions connected at bases, and may be such that a horizontal portion is present between bases of triangular protrusions. However, it is preferable that the configuration is such that a V-shaped groove is formed by connecting bases of triangles, to preferably diffuse light. Although the shape of the triangle is not specifically limited as long as the apex angle thereof is within the range described above, an isosceles triangle is preferable since brightness observed from a frontal direction of the liquid crystal display is thereby made higher.

In the present invention, the prism apex angle "y" of the prismatic ridge (1) provided on the surface of the light diffusion plate is preferably not less than 60 degrees and not more than 170 degrees, more preferably not less than 65 degrees and not more than 165 degrees, and further preferably, not less than 70 degrees and not more than 160 degrees. If the prism apex angle "y" of the prismatic ridge (1) provided on the surface of the light diffusion plate is less than 60 degrees, unevenness in brightness may possibly be increased, and if the angle "y" exceeds 170 degrees, the unevenness may also be increased.

In the present invention, a pitch of the prismatic ridge (1) of the light diffusion plate is preferably not less than 20 μm and not more than 700 μm, and more preferably not less than 30 μm and not more than 500 μm, and further preferably not less than 40 μm and not more than 400 μm. If the pitch of the prismatic ridge (1) of the light diffusion plate is less than 20 μm, it may become difficult to configure such a minute shape, and light diffusion effect thereof may possibly be lowered. If the pitch of the prismatic ridge (1) exceeds 700 μm, light diffusion becomes uneven and unevenness in brightness may possibly be caused.

In the present invention, it is possible to make output direction diverse within an appropriate range by roughening the surface of the prismatic ridge (1) of the light diffusion plate. In this case, center line average surface roughness (Ra) measured over the length of 20 μm on a surface of the prism along a direction perpendicular to the longitudinal direction of the ridge is preferable to be not less than 0.08 μm and not more than 3 μm, and more preferable to be not less than 0.09 μm and not more than 2 μm, and further preferable to be not less than 0.1 μm and not more than 1 μm. By adjusting Ra to be equal to or more than 0.08 μm, it is possible to make the output direction of light more diverse, and by adjusting Ra to be equal to or less than 3 μm, it is possible to avoid too much diversity of the output direction of light.

In the present invention, an angle formed between the longitudinal direction of the prismatic ridge (1) of the light diffusion plate and the longitudinal direction of the linear light source is preferable to be not more than 60 degrees, i.e., from 0 degrees to 60 degrees. This angle is more preferable to be not more than 50 degrees, and further preferable to be not more than 45 degrees. By adjusting the angle between the longitudinal direction of the linear light source and the longitudinal direction of the prismatic ridge to not more than 60 degrees, it is possible to reduce unevenness in brightness.

In the present invention, the method for forming the prismatic ridge having a sawtooth-shaped cross-section on a surface of the light diffusion plate is not specifically limited. For example, after preparing the light diffusion plate having a flat plane, the prismatic ridge may be formed on a surface thereof. Alternatively, the prismatic ridge may be formed simultaneously with formation of the light diffusion plate. The method for forming the prismatic ridge on a surface of the light diffusion plate having a flat plane is not specifically limited. For example, the prismatic ridge may be formed by cutting process using a tool capable of forming the desirable apex angle. Alternatively, the ridge may be formed by applying a light-curable resin, transferring on the layer of the resin a shape of a mold having a desirable angle, and then curing the resin while keeping that shape. When the light diffusion plate is formed by extrusion molding and the prismatic ridge is simultaneously formed, profile extrusion may be employed using a profile die that has a form of a prismatic ridge having a desirable apex angle. Alternatively, the prismatic ridge may be formed by embossment after extrusion molding. When the light diffusion plate is produced by casting and the prismatic ridge is simultaneously formed, such a casting may be performed with a casting mold which is capable of forming the prismatic ridge having a desirable apex angle. When the light diffusion plate is formed by injection molding and the prismatic ridge is simultaneously formed, such a molding may be performed with a mold which is capable of forming the prismatic ridge having a desirable apex angle. For transferring the shape of the mold to the light-curable resin, extrusion molding with the profile die, embossment, casting, and injection molding, the mold therefor may be obtained by cutting a metallic member in the mold with a tool which is capable of forming a desirable apex angle, or by performing electrocasting on a member on which a desirable apex angle is formed.

In the present invention, the transparent resin for use may include resins having a total light transmittance of equal to or more than 70% when a 2-mm thick plate made of the resin having smooth surfaces on both sides is measured in accordance with JIS K7361-1. Examples of the resin may include polyethylene, propylene-ethylene copolymers, polypropylene, polystyrene, copolymers of an aromatic vinyl monomer and an alkyl (meth)acrylate having a lower alkyl group, polyethylene terephthalate, terephthalic acid-ethylene glycol-cyclohexanedimethanol copolymers, polycarbonate, acrylic resins, and resins having an alicyclic structure. Among them, preferred resins are ones having a water absorption ratio equal to or less than 0.25%, namely 0 to 0.25%, such as polycarbonate, polystyrene, copolymers of an aromatic vinyl monomer in an amount equal to or more than 10% and an alkyl (meth)acrylate having a lower alkyl group, and resins having an alicyclic structure, since they are unlikely to suffer from deformation due to moisture absorption and hence can produce a large-size light diffusion plate free from warpage. Resins having an alicyclic structure are further preferred since they have excellent fluidity and they realizes efficient production of a light diffusion plate having a large-size. A composition comprising a resin having an alicyclic structure and a light diffusing agent mixed therewith has high transmission properties and high diffusion properties, both of which are properties indispensable to the light diffusion plate, and further has excellent chromaticity. Therefore such a composition is preferably used.

The resin having an alicyclic structure is a resin having an alicyclic structure in its main chain and/or side chain. In terms of achieving high mechanical strength or heat resistance, a resin having an alicyclic structure in its main chain is particularly preferred. Examples of alicyclic structures may include saturated cyclic hydrocarbon (cycloalkane) structures and unsaturated cyclic hydrocarbon (cycloalkene or cycloalkyne) structures. In terms of achieving high mechanical strength or heat resistance, preferred ones are cycloalkane structures and cycloalkene structures. Among these, cycloalkane structures are the most preferred. Although there is no particular limitation to the number of carbon atoms constituting the alicyclic structure in the resin, generally an alicyclic structure having 4 to 30, preferably 5 to 20, more preferably 5 to 15 carbon atoms per structure is advantageous in terms of highly balancing the resin properties of mechanical strength, heat resistance, and formability for the light diffusion plate. The content of repeating units having an alicyclic structure in the resin having an alicyclic structure may be appropriately selected depending on the use of the resin, but it is generally equal to or more than 50% by weight, preferably equal to or more than 70% by weight, and more preferably equal to or more than 90% by weight. When the content of the repeating units having an alicyclic structure in the resin is too small, the resultant resin disadvantageously may have a low heat resistance. Repeating units other than those having an alicyclic structure in the resin having an alicyclic structure may be appropriately selected depending on the use of the resin.

Specific examples of resins having an alicyclic structure may include: (1) norbornene polymers, such as ring-opening polymerization products of a norbornene monomer, ring-opening copolymerization products of a norbornene monomer and another monomer ring-opening copolymerizable with the norbornene monomer, hydrogenated products thereof, addition polymerization products of a norbornene monomer, and addition copolymerization products of a norbornene monomer and another monomer copolymerizable with the norbornene monomer; (2) monocyclic olefin polymers and hydrogenated products thereof; (3) cyclic conjugated diene polymers and hydrogenated products thereof; and (4) vinyl alicyclic hydrocarbon polymers, such as polymers of a vinyl alicyclic hydrocarbon monomer, copolymers of a vinyl alicyclic hydrocarbon monomer and another monomer copolymerizable with the vinyl alicyclic hydrocarbon monomer, hydrogenated products thereof, hydrogenated products at aromatic rings of polymers of a vinyl aromatic monomer, and hydrogenated products at aromatic rings of copolymers of a vinyl aromatic monomer and another monomer copolymerizable with the vinyl aromatic monomer. Among these, in terms of achieving high heat resistance or high mechanical strength, preferred are norbornene polymers and vinyl alicyclic hydrocarbon polymers, and further preferred are hydrogenated products of ring-opening polymerization products of a norbornene monomer, hydrogenated products of ring-opening copolymerization products of a norbornene monomer and another monomer ring-opening copolymerizable with the norbornene monomer, hydrogenated products at aromatic rings of polymers of a vinyl aromatic monomer, and hydrogenated products at aromatic rings of copolymers of a vinyl aromatic monomer and another monomer copolymerizable with the vinyl aromatic monomer.

The light diffusing agent used in the light diffusion plate is comprised of particles having properties for diffusing a light beam, and is roughly classified into inorganic fillers and organic fillers. As the inorganic filler, specifically, silica, aluminum hydroxide, aluminum oxide, titanium oxide, zinc oxide, barium sulfate, magnesium silicate, or a mixture thereof may be used. As a material for the organic filler, specifically, there may be used an acrylic resin, acrylonitrile, polyurethane, polyvinyl chloride, a polystyrene resin, polyacrylonitrile, polyamide, a polysiloxane resin, a melamine resin, or a benzoguanamine resin. Among these, particles comprised of a polystyrene resin, a polysiloxane resin, or a cross-linked resin thereof may be particularly preferably used since they have high dispersibility and high heat resistance and are unlikely to suffer from discoloration (yellowing) during the molding. Microparticles comprised of a cross-linked product of polysiloxane resin may be further preferably used since they have further favorable heat resistance.

Although there is no particular limitation with respect to the shape of the particles of light diffusing agent used in the light diffusion plate, the particles may be spherical, cubic, needle-shaped, rod-shaped, spindle-shaped, plate-shaped, scale-shaped, fiber-shaped, and the like. Among these, preferable shape of the particles is spherical bead-shape, which can realize isotropic direction of the light diffusion.

The light diffusing agent may be used as being contained in the transparent resin. Macroscopically, the agent may be in a uniformly and separately dispersed.

It is preferable that the backlight device according to the present invention further includes a prism sheet on a surface of the light diffusion plate opposite to the light sources, for adjusting the output direction of the light that has been diffused by and emitted from the light diffusion plate; wherein the light diffusion plate has the prismatic ridges (1) at least on the surface opposite to the light sources; wherein the prismatic ridges (1) of the light diffusion plate has the apex angle "y" from 60° to 170° and the pitch from 20 μm to 700 μm; wherein the prism sheet has a prismatic ridge (2) on a surface opposite to the light diffusion plate, the ridge (2) having a sawtooth-shaped cross-section; and wherein the prismatic ridge (2) of the prism sheet has an apex angle from 70° to 120° and a pitch from 20 μm to 700 μm. Hereafter, such an embodiment may be referred to as a "second embodiment".

Figure 3:
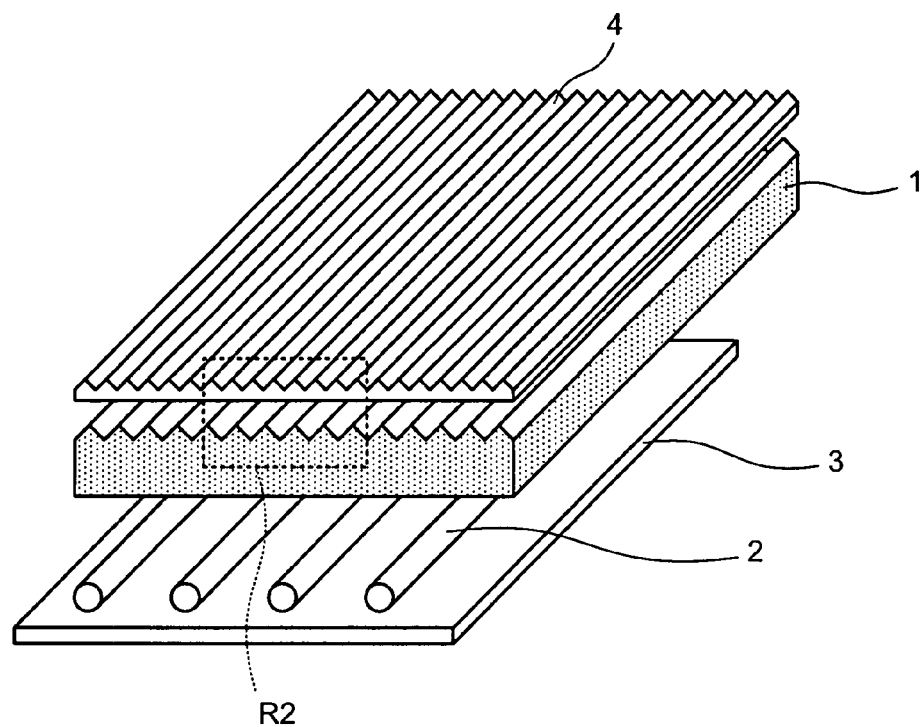
FIG. 3 is a perspective view showing one example of the direct-type backlight device according to the second embodiment of the present invention.
Figure 4:
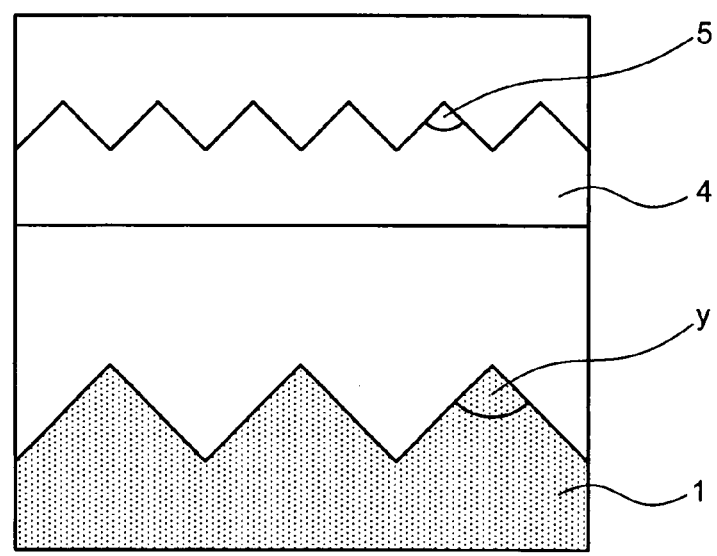
FIG. 4 is a partial enlarged cross-section showing further detail of the cross-section of the region R2 shown in FIG. 3.

FIG. 3 is a schematic perspective view of one example of the second embodiment according to the present invention, and FIG. 4 is a partial cross-section schematically showing the cross-section of the region R2 shown in FIG. 3. The direct-type backlight device according to the present embodiment includes plural pieces of the linear light sources 2 arranged in parallel, the reflection plate 3 that reflects light from the light source 2, and the light diffusion plate 1 that diffuses and emits direct light from the light source and reflected light from the reflection plate. The light diffusion plate 1 includes the prismatic ridges (1) having a sawtooth-shaped cross-section with the apex angle "y". The ridges (1) are on a main surface opposite to the light source. The present device further includes a prism sheet that has the prismatic ridge (2) having a sawtooth-shaped cross-section with an apex angle 5. The prism sheet is provided on a surface of the light diffusion plate opposite to the light source 2. An optical sheet such as a diffusion sheet may be further provided between the light diffusion plate 1 and the prism sheet 4. However, according to the second embodiment, it is possible to obtain sufficient light diffusion effect without such a diffusion sheet. Therefore, it is preferable not to provide the diffusion sheet in terms of cost. However, since the diffusion sheet also has an effect of improving brightness, the diffusion sheet may be used when brightness is desired to be further improved. The diffusion sheet referred to herein may be a sheet having thickness of about 50 μm to 300 μm to which a light diffusion effect and a function of improving brightness are added. As a diffusion sheet, a sheet coated with a light diffusion layer obtained by dispersing a light diffusing agent in a transparent binder resin is often used. Specifically, a diffusion sheet similar to that in a fourth embodiment, which will be described later, may be used.

Moreover, as an optical member to improve brightness, the aforementioned reflecting polarizer may be provided.

In the second embodiment, a material of the prism sheet is not specifically limited, although a molded product of a transparent resin that does not include a light diffusing agent may be preferably used. As this prism sheet, a commercially available one may also be used.

A prism apex angle of the prism sheet is preferable to be not less than 70 degrees and not more than 120 degrees, and more preferable to be not less than 80 degrees and not more than 100 degrees. If the prism apex angle of the prism sheet is less than 70 degrees, brightness may possibly be deteriorated, and if exceeds 120 degrees, brightness may also be deteriorated.

In the second embodiment, the pitch of the prismatic ridge (2) of the prism sheet is preferable to be not less than 20 μm and not more than 700 μm, and more preferable to be not less than 30 μm and not more than 500 μm, and further preferable to be not less than 40 μm and not more than 400 μm. If the pitch of the prismatic ridge (2) is less than 20 μm, it may become difficult to configure such a minute shape, and light diffusion effect thereof may be lowered. If the pitch of the prismatic ridge (2) exceeds 700 μm, the light diffusion effect may also be deteriorated.

In the second embodiment, it is preferable that the longitudinal directions of the light diffusion plate and the prismatic ridge of the prism sheet are both substantially parallel to the longitudinal direction of the light source. It is regarded that the longitudinal direction of the prismatic ridge and the longitudinal direction of the linear light source are substantially parallel when an angle formed by the longitudinal directions of the linear light source and the prismatic ridge is equal to or less than 60 degrees. This angle is more preferable to be equal to or less than 50 degrees, and further preferable to be equal to or less than 45 degrees. By placing the longitudinal direction of the linear light source and the longitudinal direction of the prismatic ridge substantially parallel, it is possible to reduce unevenness in brightness.

In the backlight device according to the present invention, it is preferable that the prismatic ridge (1) of the light diffusion plate has the apex angle "y" from 60° to 170° and pitch from 20 μm to 700 μm, and the reflection plate has a protrusion that projects toward the light diffusion plate, the protrusion being located along the longitudinal direction of the light sources in a region corresponding to a position between the linear light sources. With such construction, it is possible to suppress periodical unevenness in brightness on a light emitting surface in a frontal direction and an oblique direction, thereby obtaining high brightness and improving brightness uniformity in the frontal direction and the oblique direction. Hereafter, this embodiment may be referred to as the "third embodiment".

Figure 5:
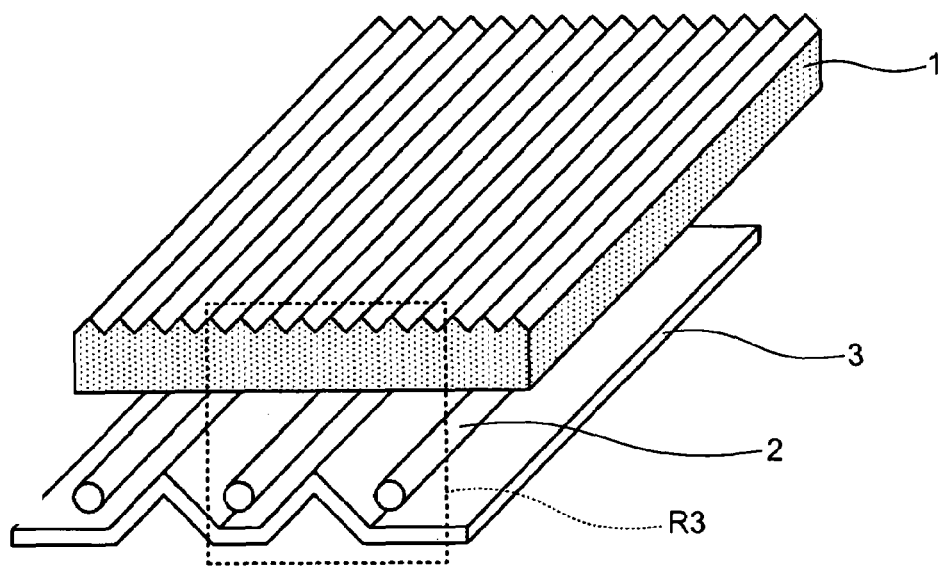
FIG. 5 is a perspective view showing one example of the direct-type backlight device according to the third embodiment of the present invention.
Figure 6:
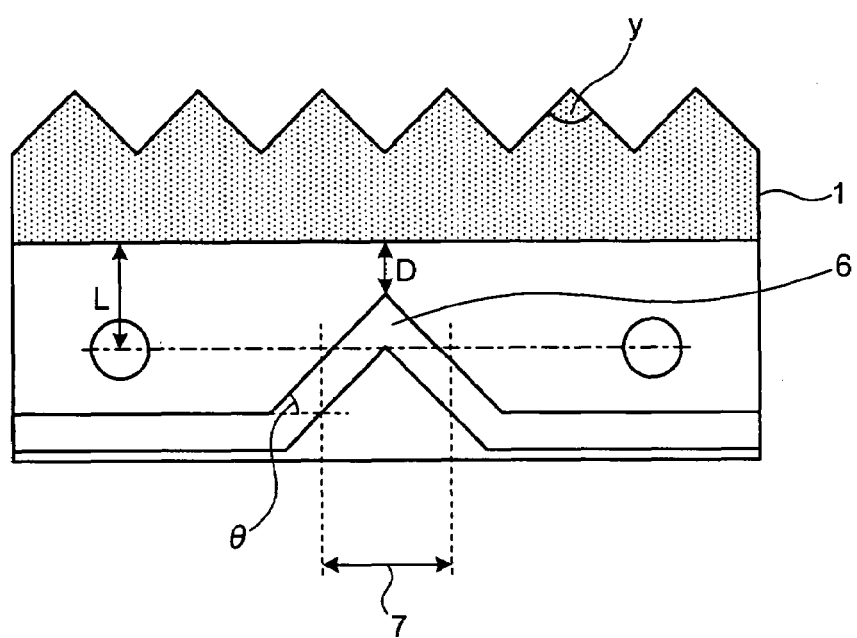
FIG. 6 is a partial enlarged cross-section showing further detail of the cross-section of the region R3 shown in FIG. 5.

FIG. 5 is a schematic perspective view of one example of the third embodiment of the present invention, and FIG. 6 is a partial cross-section schematically showing the cross-section of the region R3 shown in FIG. 5. The direct-type backlight device according to the present embodiment includes a plural pieces of the linear light source 2 arranged in parallel, the reflection plate 3 that reflects light from the light source 2, and the light diffusion plate 1 that diffuses and emits direct light from the light source 2 and reflected light from the reflection plate. In this embodiment, the light diffusion plate 1 includes the prismatic ridge having a sawtooth-shaped cross-section with the apex angle "y", and a protrusion 6 is provided on the reflection plate 3 between the linear light sources.

The reflection plate used in the third embodiment has the protrusion that protrudes toward a side of the light diffusion plate along the longitudinal direction of the linear light sources in a region corresponding to a position between the linear light sources. Since the light that has been laterally emitted from the linear light sources is reflected by the protrusion toward the light diffusion plate, it is possible to improve both brightness and brightness uniformity. While the protrusion may be a continuously ridge, or discontinuously ranged such as a series of cones, it is preferable that the protrusion is arranged continuously because thereby brightness uniformity can be further improved. It is preferable to arrange the protrusion such that a median point of a base of the protrusion is positioned in approximately middle of a distance between the centers of adjacent linear light sources, and a cross-section of the protrusion on a plane perpendicular to the longitudinal direction of the protrusion is axisymmetric with respect to a line segment perpendicular to the light diffusion plate and passing through the median point of the base of the protrusion, because brightness of the backlight in a frontal direction can be made maximum. The "approximately middle" part between the centers of the adjacent linear light sources refers to a portion between positions departing from a median point of a line connecting the centers of the adjacent two linear light sources for a length which is 10% of the distance between the centers of the light sources. For example, when the distance "a" between the centers of the adjacent linear light sources is 100 mm, the "approximately middle" herein refers to a portion between points 40 mm and 60 mm distant from the center of one of the linear light sources on the line connecting the centers of the adjacent two linear light sources.

Furthermore, a minimum direction D between a surface of the protrusion facing the light diffusion plate and a surface of the light diffusion plate facing the light reflection plate is preferable to be less than a distance L between the center of the linear light source and the surface of the light diffusion plate facing the light reflection plate, in terms of improving brightness uniformity in the oblique direction. It is preferable to arrange such that the distances D and L are both constant at any point in the longitudinal direction of the linear light sources, i.e., height of the protrusion is constant and the linear light source and the light diffusion plate are parallel, for maximizing brightness in the frontal direction of the backlight.

Figure 7:
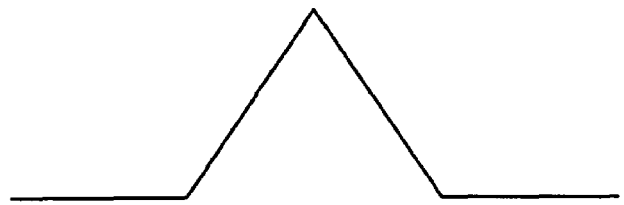
FIG. 7 is a diagram showing an example of a cross-section of a protruding portion that is provided in a reflection plate of the direct-type backlight device according to the third embodiment of the present invention.
Figure 7:
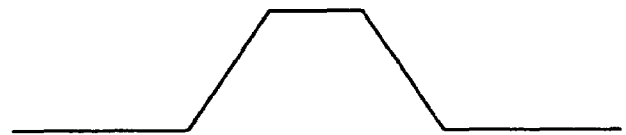
Figure 7:
Figure 7:
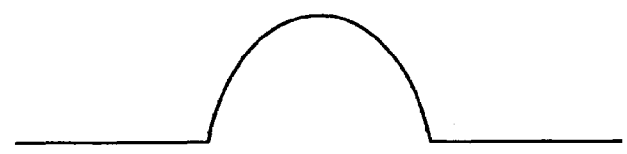
Figure 7:
Figure 7:

The shape of the cross-section of the protrusion perpendicular to the longitudinal direction thereof is not specifically limited, but an isosceles triangle as shown at (*a*) in FIG. 7, an isosceles trapezoid as shown at (*b*) in FIG. 7, a form obtained by cutting a circle as shown at (*c*) in FIG. 7, a form obtained by cutting an ellipse along a line parallel to a short axis as shown at (*d*) in FIG. 7, a form obtained by cutting an ellipse along a line parallel to a long axis, a form obtained by connecting curves convex in downward so as to be axisymmetric as shown at (*e*) in FIG. 7, a form obtained by connecting curves convex in upward so as to axisymmetric as shown at (*f*) in FIG. 7, or the like are applicable. Among these forms, forms having a sharp point can be rounded at the point. Moreover, among these forms, the isosceles triangle and the isosceles trapezoid are preferable since brightness uniformity in the frontal direction and brightness uniformity in the oblique direction can be improved simultaneously. An angle (angle indicated by θ in FIG. 6) of a slope of the protrusion in these two forms is preferable to be 10 degrees to 85 degrees with respect to a main surface of the light diffusion plate in terms of improving brightness uniformity. Length of a base of the cross-section of the protrusion is preferable to be within 80% of the distance between the centers of the two linear light sources in order to avoid contact with the linear light sources.

The method for forming the protrusion on the reflection plate used in the third embodiment is not specifically limited. For example, on the reflection plate in a form of flat plane, a separately prepared protrusion may be bonded. Alternatively, the reflection plate in a form of flat plane may be deformed by pressing and the like for forming the protrusion. As a further alternative, the protrusion may be formed simultaneously with forming the reflection plate. The method of forming the protrusion simultaneously with forming the reflection plate is not specifically limited. For example, when the reflection plate is manufactured by extrusion molding together with the protrusion, a profile extrusion using a profile die having a form of the protrusion may be employed. Alternatively, the reflection plate may be manufactured by injection molding using a mold having a form of the protrusion.

In the backlight device according to the present invention, it is preferable that the prismatic ridge (1) of the light diffusion plate has the apex angle "y" from 60° to 170° and pitch from 20 μm to 700 μm, and two to four sheets of diffusion sheets for adjusting light which has been diffused by and emitted from the light diffusion plate are further provided on a surface of the light diffusion plate opposite to the light sources. With such an embodiment, it is possible to provide a direct-type backlight device with a high ratio of effective light beam utilization, suppressed periodical unevenness in brightness on the light emitting surface, high brightness, and excellent brightness uniformity, with a simple method. Hereafter, this embodiment may be referred to as a "fourth embodiment".

Figure 8:
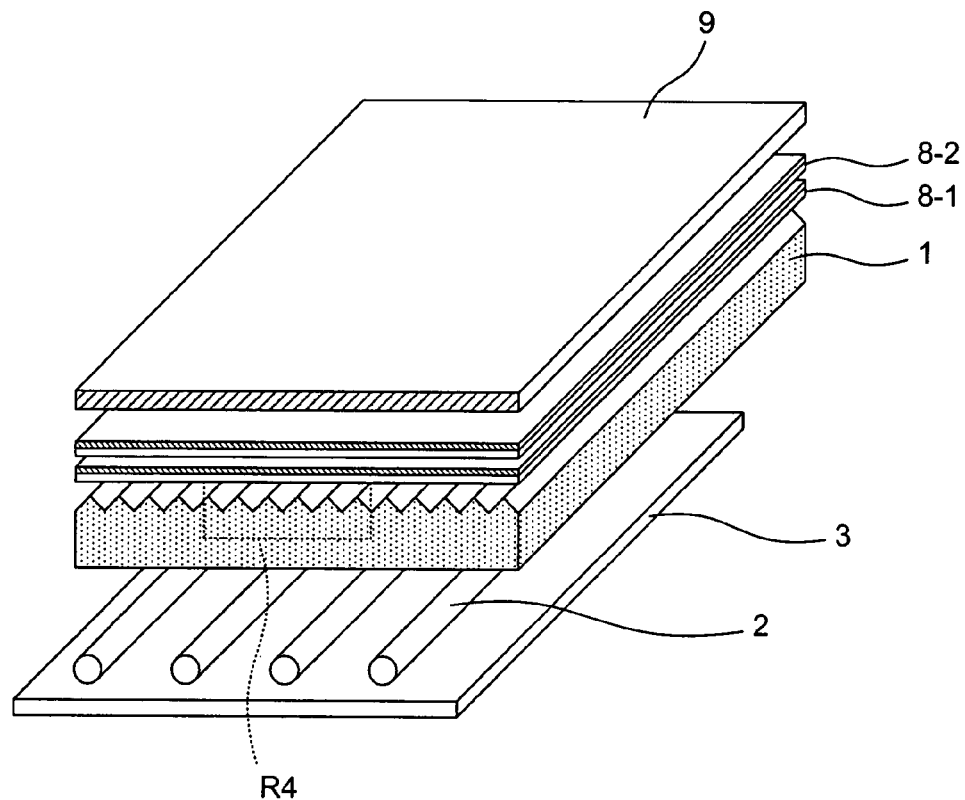
FIG. 8 is a perspective view showing one example of the direct-type backlight device according to the fourth embodiment of the present invention.
Figure 9:
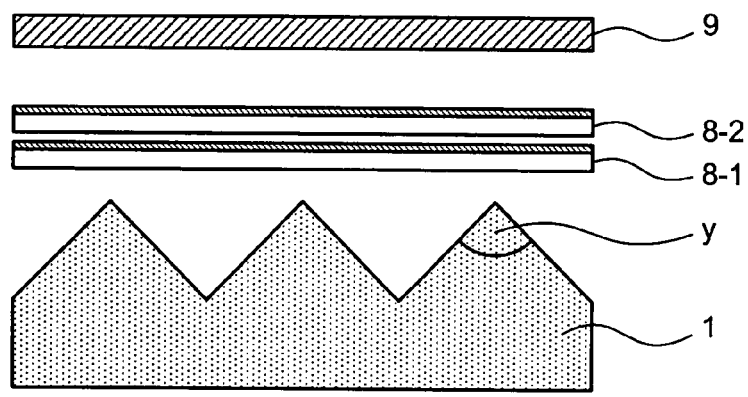
FIG. 9 is a partial enlarged cross-section showing further detail of the cross-section of the region R4 shown in FIG. 8.

FIG. 8 is a schematic perspective view of one example of a direct-type backlight device according to the fourth embodiment of the present invention, and FIG. 9 is t partial cross-section schematically showing the cross-section of the region R4 shown in FIG. 8. The direct-type backlight device according to the present embodiment includes plural pieces of the linear light sources 2 arranged in parallel, the reflection plate 3 that reflects light from the light source 2, and the light diffusion plate 1 that diffuses and emits direct light from the light source and reflected light from the reflection plate. The light diffusion plate 1 includes the prismatic ridges (1) of a sawtooth-shaped cross-section having the apex angle 5 on a surface opposite to the light source 2, and two sheets of diffusion sheets 8-1 and 8-2 are further provided on the light diffusion plate 1 on the surface opposite to the light source 2. As the optical member 9 for further improvement of brightness, the aforementioned reflecting polarizer may be further provided on the diffusion sheet 8-2 on a surface opposite to the light source 2.

The diffusion sheet used in the fourth embodiment may be a sheet having a light diffusion function and having a thickness equal to or less than 500 μm. Although the structure thereof is not specifically limited, a transparent resin substrate sheet to which a layer containing a light diffusing agent is applied to at least one surface is preferably used. As this diffusion sheet, a commercially available product may also be used.

The thickness of the diffusion sheet may be equal to or less than 500 μm, however, it is more preferably to be 50 μm to 300 μm. If the thickness is equal to or less than 50 μm, creases may be caused by influence of temperature or humidity, and display unevenness on a liquid crystal display may also be caused. If the thickness is equal to or more than 300 μm, the liquid crystal display may become too thick, therefore not being preferable. Haze of the diffusion sheet is preferable to be equal to or more than 10%, more preferable to be equal to or more than 15%, and further preferable to be equal to or more than 30%. If the haze is less than 10%, an effect of improving brightness uniformity may possibly be insufficient. Total light transmittance of the diffusion sheet is preferable to be equal to or more than 40%, more preferable to be equal to or more than 50%, and further preferable to be equal to or more than 60%. If the total light transmittance is less than 40%, brightness may possibly be deteriorated. The total light transmittance is a value obtained by measuring the diffusion sheet in accordance with JIS K7361-1, and the haze is a value obtained by measuring the diffusion sheet in accordance with JIS K7136.

The resin for the substrate sheet of the diffusion sheet is not specifically limited, and examples thereof may include polyethylene terephthalate, polyethylene naphthalate, acrylic resins, polycarbonate, polystyrene, polyethylene, polypropylene, resins having an alicyclic structure, cellulose acetate, and weatherable vinyl chloride. Among these, in terms of achieving both excellent transparency and excellent film-formability, preferred ones are polyethylene terephthalate, polycarbonate, polypropylene, resins having an alicyclic structure, and cellulose acetate.

The layer containing the light diffusing agent that constitutes the diffusion sheet may be made of a binder and a light diffusing agent, the particles of which is dispersed in this binder in a separate manner. With the light diffusing agent thus dispersed, it is possible to diffuse light beams passing through this layer containing the light diffusing agent. Further, by making an upper end of the light diffusing agent particles protrude from the binder surface, it is possible to diffuse light beams more effectively. Thickness of the layer containing the light diffusing agent is not specifically limited, and for example, it is preferable to be approximately more than 1 μm to less than 50 μm.

The polymer used in the binder is not specifically limited, and examples thereof may include acrylic resins, polyurethane, polyester, fluororesins, silicone resins, poly amide imide, and epoxy resins. Into the binder, in addition to the polymer, for example, a reinforcing filler, a plasticizer, a stabilizer, an antidegradant, a dispersant, and an antistatic agent may be incorporated.

The light diffusing agent used in the diffusing sheet is comprised of particles having properties such that they diffuse a light beam, and is roughly classified into inorganic fillers and organic fillers. As the inorganic filler, specifically, silica, aluminum hydroxide, aluminum oxide, titanium oxide, zinc oxide, barium sulfate, magnesium silicate, or a mixture thereof may be used. As a material for the organic filler, specifically, there may be used an acrylic resin, acrylonitrile, polyurethane, polyvinyl chloride, a polystyrene resin, polyacrylonitrile, polyamide, a polysiloxane resin, a melamine resin, or a benzoguanamine resin.

The shape of the light diffusing agent used in the diffusing sheet is not specifically limited, and for example, the shape may be spherical, cubic, needle-shaped, rod-shaped, spindle-shaped, plate-shaped, scale-shaped, fiber-shaped, or the like, and among these, it is preferable to be spherical bead-shape, which can improve brightness in the frontal direction when the upper end of the light diffusing agent particles protrudes from the binder surface.

The method of manufacturing the diffusion sheet for use in the present invention is not specifically limited, and the following methods may be enumerated. These methods are easier than the methods for manufacturing the prism sheet, and therefore, it is possible to obtain the direct-type backlight device with a simple method.

(1) Method in which the substrate sheet is obtained by forming a film with the resin for the substrate sheet by extrusion or by casting the solution, and the binder containing the light diffusing agent dispersed therein is applied to this transparent resin substrate sheet.

(2) Method in which the resin for the substrate sheet, and the mixture of the resin for the binder and the light diffusing agent are subjected to two-layer extrusion.

The backlight device according to the present invention may be applied to an any device that is required to emit light uniformly over a large area, and is particularly suitable as a direct-type backlight device for a variety of types of liquid crystal displays.

The backlight device according to the present invention is not limited to ones specifically described above, and may include anything within the scope of the claims of the present invention and their equivalents. For example, in each of the devices specifically explained in the above, the examples including the light diffusion plate provided with the prismatic ridges (1) on only the main surface opposite to the light source have been explained. However, unless otherwise particularly specified in a specific embodiment, the prismatic ridges (1) of the light diffusion plate may be provided on the main surface facing the light source, or on both main surfaces. Moreover, in the embodiment in which the prismatic ridges (1) are provided on at least the main surface opposite to the light source, the prismatic ridges (1) may be provided on both main surfaces.

Furthermore, although the examples of the devices specifically explained above have the prism sheet with the prismatic ridges (2) provided only on the main surface opposite to the light source, unless otherwise particularly specified in a specific embodiment, the prismatic ridges (2) of the prism sheet may be provided only on the surface facing the light source, or on both main surfaces. Furthermore, in the embodiment in which the prismatic ridges (2) are provided on at least the main surface opposite to the light source, the prismatic ridges (2) may be provided on both main surfaces.

Moreover, when the backlight device according to the present invention includes the prism sheet, the diffusion sheet, and the reflecting polarizer, or a combination thereof as an optional component, unless otherwise particularly specified in a specific embodiment, any number of these components may be provided in any order at any position on or above the surface of the light diffusion plate 1 opposite to the light source.

EXAMPLES

The present invention will be explained hereinbelow in detail with reference to the following Examples, although the present invention is not limited to the Examples. Parts and percentages (%) are given by weight, unless otherwise specified.

Example 1

A resin having an alicyclic structure (ZEONOR 1060R by ZEON CORPORATION, water absorption ratio 0.01%) as a transparent resin, and microparticles comprised of a cross-linked product of polysiloxane polymer (TOSPEARL 120 by GE Toshiba Silicone Co., Ltd.) as a light diffusing agent were mixed at proportion of 99.7 parts and 0.3 part, kneaded and extruded to be in a strand form by a two-axis extrusion kneader, and cut by a pelletizer to manufacture pellets for the light diffusion plate. With these pellets for the light diffusion plate, a test plate having smooth surfaces on both sides, thickness of 2 mm, and size of 100 mm×50 mm was molded using an injection molder (mold clamping force 1000 kN). The total light transmittance and the haze of this test plate were measured in accordance with JIS K7361-1 and JIS K 7136 using an integrating sphere type color-difference/turbidity measuring instrument. The total light transmittance was 78% and the haze was 92%.

A reflection sheet (RF188 by TSUJIDEN Co., Ltd.) was attached as a reflection plate to the internal surface of an opaque white plastic case having inside dimension of width 300 mm, depth 240 mm, and height 18 mm. Keeping 4 mm distance from the bottom of the reflection plate, eight pieces of the cold cathode fluorescent lamps having diameter of 4 mm and length of 360 mm were arranged such that the distance "a" between the centers of the cold cathode fluorescent lamps was 25 mm. Portions of the lamps near electrodes were fixed with silicone sealant and an inverter was attached to the lamps. In the backlight device of this design, the distance "b" from the center of the cold cathode fluorescent lamp to the surface of the light diffusion plate facing the cold cathode fluorescent lamp is 14 mm. Therefore, by substituting values of "a" and "b" into Formula 1, a preferable range of the prism apex angle "y" is acquired as 59.8<y<170.8.

Therefore, by cutting a metallic portion of a mold, a mold was prepared with which ranging prismatic ridges having a cross-section of isosceles triangles having an apex angle of 110 degrees can be formed in a direction parallel to a longitudinal direction. With the mold and the pellets for the light diffusion plate, the light diffusion plate 1 having the prismatic ridges of which the pitch is 50 μm, thickness of 2 mm, size of 250 mm×310 mm was molded at cylinder temperature of 280° C. and mold temperature of 85° C. using the injection molder (mold clamping force 4410 kN). When the surface of the formed light diffusion plate 1 was observed with an in-depth microscope, the apex angle of the prism was 110 degrees and surface roughness Ra was 0.04 μm.

The light diffusion plate 1 above was set on the plastic case to which the cold cathode fluorescent lamp was attached, such that the prismatic ridges are parallel to the cold cathode fluorescent lamps and positioned on the surface opposite to the lamps. Further, the prism sheet (RBEF by Sumitomo 3M Limited, prism apex angle: 90 degrees) was set such that the longitudinal direction of the prismatic ridges was parallel to the cold cathode fluorescent lamp and positioned on the surface opposite to the light diffusion plate. A reflecting polarizer utilizing birefringence (DBEF-D by Sumitomo 3M Limited) was set thereon, and the polarizing plate was further attached, to produce the direct-type backlight device 1.

In the direct-type backlight device 1, tube current of 6 mA and tube voltage of 330 Vrms were applied to light the cold cathode fluorescent lamps on. Brightness was measured with a two-dimensional color distribution meter at 100 points along the center line in a crosswise direction at regular intervals. The average brightness La in the frontal direction and the brightness uniformity Lu were calculated in accordance with the following Formula 2 and Formula 3. The average brightness was 3641 cd/m² and the brightness uniformity was 0.5. The results are shown in table 1. Subsequently, setting of the two-dimensional color distribution meter was changed to a 45 degrees oblique position with respect to a plane perpendicular to the longitudinal direction of the linear light source from the frontal direction, and the same measurement was performed to measure brightness uniformity in an oblique direction, which was found to be 0.8.

Average brightness $La=(L1+L2)/2$ (Formula 2)

Brightness uniformity $Lu=((L1-L2)/La)\times 100$ (Formula 3)

L1: Average of the brightness maximal values right above the cold cathode fluorescent lamps provided in plurality L2: Average of the minimal values between maximal values The brightness uniformity is an index indicating uniformity in brightness, and when the brightness uniformity is poor, the value becomes large.

Example 2

A reflection sheet (RF188 by TSUJIDEN Co., Ltd.) was attached as a reflection plate to the internal surface of an opaque white plastic case having inside dimension of width 300 mm, depth 240 mm, and height 11 mm. Keeping 4 mm distance from the bottom of the reflection plate, eight pieces of the cold cathode fluorescent lamps having diameter of 4 mm and length of 360 mm were arranged such that the distance "a" between the centers of the cold cathode fluorescent lamps was 25 mm. Portions of the lamps near electrodes were fixed with silicone sealant and an inverter was attached to the lamps. In the backlight device of this design, the distance "b" from the center of the cold cathode fluorescent lamp to the surface of the light diffusion plate facing the cold cathode fluorescent lamp is 7 mm. Therefore, by substituting values of "a" and "b" into Formula 1, a preferable range of the prism apex angle "y" is acquired as 37.4<y<120.4.

Therefore, by cutting a metallic portion of a mold, a mold was prepared with which ranging prismatic ridges having a cross-section of isosceles triangles having an apex angle of 95 degrees can be formed in a direction parallel to a longitudinal direction. With the mold and the pellets for the light diffusion plate, the light diffusion plate 2 having the prismatic ridges of which the pitch is 50 μm, thickness of 2 mm, size of 250 mm×310 mm was molded at cylinder temperature of 280° C. and mold temperature of 85° C. using the injection molder (mold clamping force 4410 kN). When a surface of the formed light diffusion plate 2 was observed with an in-depth microscope, the apex angle of the prism was 95 degrees and surface roughness Ra was 0.04 µm.

A direct-type backlight device 2 was produced with this light diffusion plate 2 in the same manner as in Example 1, and evaluation thereof was conducted. The average brightness was 3722 cd/m$^2$ and the brightness uniformity was 1.8. The results are shown in Table 1. The brightness uniformity in an oblique direction was 2.3.

Example 3

A direct-type backlight device 3 was produced in the same manner as in Example 1 except that a prism sheet was used in place of the reflecting polarizer utilizing birefringence. The prism sheet was provided such that the longitudinal direction of the prismatic ridges is at 90 degrees with respect to the cold cathode fluorescent lamps and positioned on the surface opposite to the light diffusion plate. The evaluation thereof was conducted. The brightness was 3639 cd/m$^2$ and the brightness uniformity was 0.4. The results are shown in Table 1. The brightness uniformity in an oblique direction was 0.6.

Example 4

An acrylic resin (DELPET80NH by Asahi Kasei Corporation, water absorption ratio 0.30%) and microparticles composed of a cross-linked product of polysiloxane polymer (TOSPEARL 120 by GE Toshiba Silicone Co., Ltd.) were mixed at proportion of 99.65 parts and 0.35 part, and pellets for the light diffusion plate was manufactured in the same manner as in Example 1. The total light transmittance and the haze were measured in the same manner as in Example 1. The total light transmittance was 83% and the haze was 91%.

A light diffusion plate 3 was formed in the same manner as in Example 1 except that the pellets prepared in accordance with the above containing the acrylic resin and the light diffusing agent were used as the pellets for the light diffusion plate and a mold of which an apex angle is 120 degrees was used. The evaluation thereof was conducted. It was observed that the obtained light diffusion plate 3 warped. When the plate was placed on a stool facing the prismatic ridges downward, the warp was such that the average value of the lifting on four corners was 5 mm. The pitch in a prism portion of the obtained light diffusion plate 3 was 50 µm, the apex angle was 120 degrees, and the surface roughness Ra was 0.03 µm. Except that this light diffusion plate 3 was used, a direct-type backlight device 4 was produced in the same manner as in Example 1, and evaluation thereof was conducted. The brightness was 3450 cd/m$^2$ and the brightness uniformity was 1.8. The results are shown in Table 1. The brightness uniformity from an oblique direction was 1.

Example 5

A reflection sheet (RF188 by TSUJIDEN Co., Ltd.) was attached to the internal surface of an opaque white plastic case having inside dimension of width 300 mm, depth 240 mm, and height 17 mm. Keeping 3.5 mm distance from the reflection plate, eight pieces of the cold cathode fluorescent lamps having diameter of 4 mm and length of 360 mm were arranged such that electrodes protrude out of the case, and the distance a between the centers of the cold cathode fluorescent lamps was 33 mm, in parallel in a width direction, and portions near electrodes were fixed with silicone sealant and an inverter was attached to the lamps. Furthermore, opaque white plastic triangular poles having a cross-section of an isosceles right triangle of which base is 18 mm and height is 9 mm were cut into length so that the poles can be inserted in the plastic case in aligning manner along the widthwise direction thereof without leaving any gap. The poles were arranged in parallel with respect to the widthwise direction, and bonded in the plastic case at the base portion of the triangle so that the right angle portion of the triangles became the top. Also on the triangular pole, the reflection sheet (RF188 by TSUJIDEN Co., Ltd.) was applied so as to configure a reflection plate having protrusions. The poles were arranged such that a median point of the base of the triangle was positioned on a line corresponding to a middle of a line connecting the centers of the adjacent two cold cathode fluorescent lamps when viewed from the light diffusion plate.

The light diffusion plate 1 obtained in Example 1 was set such that the prismatic ridges were parallel to the cold cathode fluorescent lamps and on the opposite surface of the lamps, the distance L between the center of the cold cathode fluorescent lamps and the surface of the light diffusion plate facing the reflection plate was 13.5 mm, and the shortest distance D between the surface of the protrusion and the surface of the light diffusion plate facing the reflection plate was 8.0 mm. A diffusion sheet (Light Up 100GM3 by KIMOTO Co., LTD.) was provided thereon. A prism sheet (REFII by Sumitomo 3M Limited) was further provided such that the longitudinal direction of the prismatic ridges was parallel to the cold cathode fluorescent lamps, and the prismatic ridges were on a surface opposite to the light diffusion plate. The reflecting polarizer (DBEF-D by Sumitomo 3M Limited) utilizing birefringence was provided thereon, and the polarization plate was further attached. Thus, a direct-type backlight device 5 was produced.

Subsequently, tube current of 6 mA and tube voltage of 330 Vrms were applied to the cold cathode fluorescent lamp. Brightness was measured with a two-dimensional color distribution meter set in a normal direction with respect to the light diffusion plate. Measurement was performed at 100 points along the center line in a crosswise direction. The average brightness La in the frontal direction and the brightness uniformity Lu were thus measured. The average brightness was 3710 cd/m$^2$ and the brightness uniformity was 1.0. The results are shown in Table 1. The brightness uniformity in an oblique direction was 2.8.

Example 6

A reflection sheet (RF188 by TSUJIDEN Co., Ltd.) was attached as a reflection plate to the internal surface of an opaque white plastic case having inside dimension of width 300 mm, depth 240 mm, and height 18 mm. Keeping 4 mm distance from the reflection plate, eight pieces of the cold cathode fluorescent lamps having diameter of 4 mm and length of 360 mm were arranged such that the distance "a" between the centers of the cold cathode fluorescent lamps was 25 mm, and portions near electrodes were fixed with silicone sealant and an inverter was attached to the lamps. The light diffusion plate 1 obtained in Example 1 was placed such that the prismatic ridges were parallel to the cold cathode fluorescent lamps and positioned on the surface opposite to the lamps. The distance between the center of the cold cathode fluorescent lamp and the surface of the light diffusion plate facing the cold cathode fluorescent lamp was 14 mm. Furthermore, two sheets of the diffusion sheets (Light Up 100GM3 by KIMOTO Co., LTD.) having total light transmittance of 75.5%, haze of 87%, and thickness of 137 µm were provided such that a layer containing a light diffusing agent is positioned on a surface opposite to the light diffusion plate. A reflecting polarizer (DBEF-M by Sumitomo 3M Limited) using birefringence was provided thereon, and the polarization plate was further attached. Thus, a direct-type backlight device 6 was produced.

In the direct-type backlight device 6, tube current of 6 mA and tube voltage of 330 Vrms were applied to light the cold cathode fluorescent lamps on. Brightness was measured with a two-dimensional color distribution meter at 100 points along the center line in a crosswise direction at regular intervals. The average brightness La in the frontal direction and brightness uniformity Lu were calculated in accordance with the aforementioned Formula 2 and Formula 3. The average brightness was 4380 cd/m$^2$ and the brightness uniformity was 0.8. The results are shown in Table 1. The brightness uniformity in an oblique direction was 1.2.

Example 7

Except that four sheets of the diffusion sheets were provided, a direct-type backlight device 7 was produced in the same manner as in Example 6, and evaluation thereof was conducted. Pitch at the prism portion of the diffusion plate was 50 μm, the apex angel was 110 degrees, and surface roughness Ra was 0.04 μm. The average brightness was 4150 cd/m$^2$ and brightness uniformity was 1.0. The results are shown in Table 1. The brightness uniformity in an oblique direction was 1.1.

Comparative Example 1

Except that a molding member with which a prismatic ridge having an apex angle of 40 degrees can be formed is used, a light diffusion plate 4 was formed in the same manner as in Example 1. A direct-type backlight device 8 was then produced, and evaluation thereof was conducted. The apex angle of the prism of the light diffusion plate 4 was 40 degrees. The average brightness was 3289 cd/m$^2$, and the brightness uniformity was 1.8. The results are shown in Table 2. The brightness uniformity in an oblique direction was 5.

Comparative Example 2

Except that a mold having smooth surface without a prism form was used, a light diffusion plate 5 was formed in the same manner as in Example 1. A direct-type backlight device 9 was then produced, and evaluation thereof was conducted. The surface roughness Ra was 0.04 μm, the average brightness was 4188 cd/m$^2$, and the brightness uniformity was 11.7. The results are shown in Table 2. The brightness uniformity in an oblique direction was 14.8.

Comparative Example 3

Except that a molding member with which the prism apex angle can be formed at 30 degrees was used, a light diffusion plate 6 was formed in the same manner as in Example 2, and evaluation thereof was conducted. The apex angle of the prism of the light diffusion plate was 30 degrees, and the surface roughness Ra was 0.04 μm. The average brightness was 3102 cd/m$^2$ and the brightness uniformity was 8.0. The results are shown in Table 2. The brightness uniformity in an oblique direction was 10.5.

TABLE 1

|  | Ex. 1 | Ex. 2 | Ex. 3 | Ex. 4 | Ex. 5 | Ex. 6 | Ex. 7 |
|---|---|---|---|---|---|---|---|
| Reflecting polarizer | Present | Present | Not present | Present | Present | Present | Present |
| Prism sheet | | | | | | | |
| Perpendicular arrangement | — | — | Apex angle 90° | — | — | — | — |
| Parallel arrangement | Apex angle 90° | Apex angle 90° | Apex angle 90° | Apex angle 90° | Apex angle 90° | — | — |
| Diffusion sheet | | | | | | | |
| Number of sheets | — | — | — | — | 1 | 2 | 4 |
| Haze (%) | — | — | — | — | 87 | 87 | 87 |
| Total light transmittance (%) | — | — | — | — | 75.5 | 75.5 | 75.5 |
| Light diffusion plate | | | | | | | |
| Prism apex angle "y" (Degree) | 110 | 90 | 110 | 110 | 110 | 110 | 110 |
| Haze (%) | 92 | 92 | 92 | 92 | 78 | 92 | 92 |
| Total light transmittance (%) | 78 | 78 | 78 | 78 | 86 | 78 | 78 |
| Used resin | Resin with alicyclic structure | Resin with alicyclic structure | Resin with alicyclic structure | Acrylic resin | Resin with alicyclic structure | Resin with alicyclic structure | Resin with alicyclic structure |
| Reflection plate | | | | | | | |
| Presence or absence of protrusion and shape | Not present | Not present | Not present | Not present | Present, isosceles triangle | Not present | Not present |
| L (mm) | — | — | — | — | 13.5 | — | — |
| D (mm) | — | — | — | — | 8 | — | — |
| Light source interval "a" (mm) | 25 | 25 | 25 | 25 | 33 | 25 | 25 |
| Light source - Light diffusion plate distance "b" (mm) | 14 | 7 | 14 | 14 | 14 | 14 | 14 |

TABLE 1-continued

|  | Ex. 1 | Ex. 2 | Ex. 3 | Ex. 4 | Ex. 5 | Ex. 6 | Ex. 7 |
|---|---|---|---|---|---|---|---|
| Average brightness (cd/m$^2$) | 3,641 | 3,722 | 3,605 | 3,450 | 3,710 | 4,380 | 4,150 |
| Brightness uniformity in frontal direction | 0.5 | 1.8 | 0.4 | 1.8 | 1 | 0.8 | 1 |

TABLE 2

|  |  | Comparative Ex. 1 | Comparative Ex. 2 | Comparative Ex. 3 |
|---|---|---|---|---|
| Reflecting polarizer |  | Present | Present | Present |
| Prism sheet | Perpendicular arrangement | — | — | — |
|  | Parallel arrangement | Apex angle 90° | Apex angle 90° | Apex angle 90° |
| Diffusion sheet | Number of sheets | — | — | — |
|  | Haze (%) | — | — | — |
|  | Total light transmittance (%) | — | — | — |
| Light diffusion plate | Prism apex angle "y" (Degree) | 40 | — | 30 |
|  | Haze (%) | 92 | 92 | 92 |
|  | Total light transmittance (%) | 78 | 78 | 78 |
|  | Used resin | Resin with alicyclic structure | | |
| Reflection plate | Presence or absence of protrusion and shape | Not present | Not present | Not present |
|  | L (mm) | — | — | — |
|  | D (mm) | — | — | — |
| Light source interval "a" (mm) |  | 25 | 25 | 25 |
| Light source - Light diffusion plate distance "b" (mm) |  | 14 | 14 | 7 |
| Average brightness (cd/m$^2$) |  | 3,289 | 4,188 | 3,102 |
| Brightness uniformity in frontal direction |  | 1.8 | 11.7 | 8 |

From the results shown in Table 1 and Table 2, the following is found: According to the Examples, when the apex angle "y" of the prismatic ridge of the light diffusion plate is within a range satisfying Formula 1, preferable values, such as average brightness being 3400 cd/m$^2$ or more and brightness uniformity being 2 or less, are obtained. On the other hand, as shown in Comparative Example 1 and Comparative Example 3, when the apex angel "y" of the prismatic ridge of the light diffusion plate is smaller than the range of Formula 1, average brightness is poor. Moreover, as shown in Comparative Example 2, when the prismatic ridge of the light diffusion plate is not present, although brightness is high, brightness uniformity is deteriorated.

The invention claimed is:

1. A direct-type backlight device comprising:
   a plurality of linear light sources that are arranged in parallel,
   a reflection plate reflecting light from the linear light sources, and
   a light diffusion plate for diffusing and emitting direct light from the linear light sources and reflected light from the reflected plate;
   the reflection plate, the linear light sources, and the light diffusion plate being arranged in this order;

wherein:
   the light diffusion plate has the prismatic ridges (1) at least on the surface being on the opposite side to the light sources, each of the ridges having a sawtooth-shaped cross-section;
   the apex angle "y" (degree) of the prismatic ridge (1) of the light diffusion plate, the distance "a" (mm) between centers of the adjacent linear light sources, and the distance "b" (mm) from a center of the linear light sources to the surface of the light diffusion plate facing the light source satisfy the following relationship:

$$80 \times (b/a) + 15 < y < 180 \times (b/a) + 70;$$

wherein the direct-type backlight device further comprises a prism sheet on a surface of the light diffusion plate, the surface being on the opposite side to the light sources, for adjusting the output direction of the light that has been diffused by and emitted from the light diffusion plate;
   the prismatic ridges (1) of the light diffusion plate has the apex angle "y" from 60° to 170° and the pitch from 20 μm to 700 μm;
   the prism sheet has a prismatic ridge (2) on the surface being on the opposite side to the light diffusion plate, the ridge (2) having a sawtooth-shaped cross-section;
   the prismatic ridge (2) of the prism sheet has the apex angle from 70° to 120° and the pitch from 20 μm to 700 μm, and wherein each of the longitudinal direction of the prismatic ridges (1) of the light diffusion plate and that of the prismatic ridges (2) of the prism sheet is substantially parallel to the longitudinal direction of the linear light sources.

2. The direct-type backlight device according to claim 1, wherein:
the parameters "y", "a", and "b" satisfy the following relationship:

$$80\times(b/a)+15<y<180\times(b/a)+60.$$

3. The direct-type backlight device according to claim 1, wherein:
the prismatic ridge (1) of the light diffusion plate has the apex angle "y" from 60° to 170° and the pitch from 20 μm to 700 μm; and
the reflection plate has a protrusion that projects toward the light diffusion plate, the protrusion being located along the longitudinal direction of the light sources in the region corresponding to the position between the linear light sources.

4. The direct-type backlight device according to claim 3, wherein:
the median point of the base of the protrusion located on the reflection plate is positioned in the approximately middle part between the centers of the linear light sources; and
the cross-section of the protrusion on the plane perpendicular to the longitudinal direction thereof is axisymmetric along the line passing through the median point of the base of the protrusion and perpendicular to the light diffusion plate.

5. The direct-type backlight device according to claim 3, wherein:
the device satisfies the relationship L>D;
when D represents the shortest distance between the surface of the protrusion located on the reflection plate facing the light diffusion plate and the surface of the light diffusion plate facing the reflection plate; and
L represents the distance between the center of the linear light sources and the surface of the light diffusion plate facing the reflection plate.

6. The direct-type backlight device according to claim 3, wherein:
the protrusion has a cross-section of any one of an isosceles triangle and an isosceles trapezoid.

7. The direct-type backlight device according to claim 1, wherein:
the prismatic ridge (1) of the light diffusion plate has the apex angle "y" from 60° to 170° and the pitch from 20 μm to 700 μm; and
the direct-type backlight further comprises two to four sheets of diffusion sheets for adjusting light which has been diffused by and emitted from the light diffusion plate on the surface of the light diffusion plate, the surface being on the opposite side to the light sources.

8. The direct-type backlight device according to claim 1, wherein:
the surface of the prismatic ridges (1) of the light diffusion plate has the center line average surface roughness (Ra) from 0.08 μm to 3 μm.

9. The direct-type backlight device according to claim 1, wherein:
the angle between the longitudinal direction of the prismatic ridges (1) and the longitudinal direction of the linear light sources is equal to or less than 60 degrees.

10. The direct-type backlight device according to claim 1, wherein:
the light diffusion plate is made of a composition containing a transparent resin and a light diffusing agent dispersed therein, the total light transmittance of the composition is from 60% to 92%, and the haze of the composition is from 40% to 94%.

11. The direct-type backlight device according to claim 10, wherein:
the transparent resin has the water absorption ratio from 0.25% or lower.

12. The direct-type backlight device according to claim 10, wherein:
the light diffusing agent is a polystyrene polymer or a polysiloxane polymer, or a cross-linked product thereof.

* * * * *